United States Patent Office 3,518,335
Patented June 30, 1970

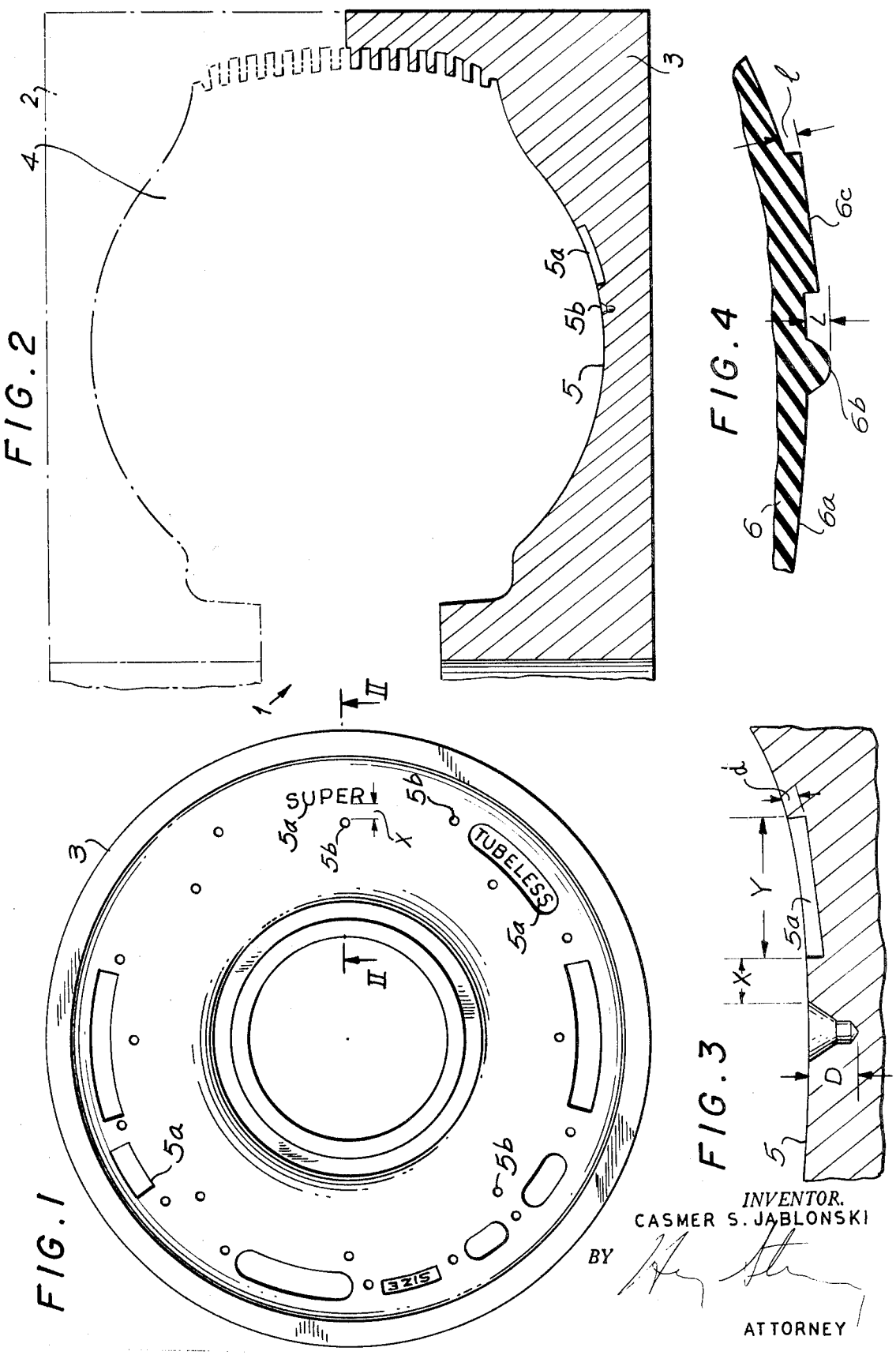

3,518,335
TIRE VULCANIZING METHOD
Casmer S. Jablonski, Detroit, Mich., assignor to Uniroyal, Inc., New York, N.Y., a corporation of New Jersey
Filed Apr. 13, 1967, Ser. No. 630,595
Int. Cl. B29h 21/02, 17/10
U.S. Cl. 264—93                                    1 Claim

ABSTRACT OF THE DISCLOSURE

Providing at least one relatively short cavity in a tire mold in the region of tire marking indicia so that trapped gas will escape into such cavity whereby the indicia will be molded without blemish and without requiring tire rubber to be trimmed in the indicia regions.

---

This invention relates generally to the vulcanizing of tires and more specifically to the evacuation of gaseous medium from certain of the sidewall regions of a tire during vulcanization and finish molding thereof.

It is very common to provide markings on the sidewalls of vehicular tires indicating, for example, the name of the manufacturer, the type, size, and serial number of the particular tire. Such marking indicia are normally molded in-relief on the sidewalls of a tire at the time of finish molding thereof in a vulcanizing mold. Such indicia on the sidewall of a tire usually comprises letters or numbers in-relief and of relatively short height above the tire sidewall surface, and are therefore easily blemished by surface irregularities such as blow holes, etc., resulting from the entrapment of gaseous medium between the partly finished tire and the inner mold surfaces of the vulcanizing mold. Because of the relatively short height of the indicia, surface blemishes caused by the presence of gaseous medium in the mold may entirely or partly obliterate some of the indicia markings so that these become impossible or difficult to read or, at the very least, unsightly. The surface irregularities caused by the presence in the mold of gaseous medium can thus mar the appearance and legibility of the nomenclature on the tire sidewall, and therefore be unacceptable for sale as a finished product.

In order to prevent the aforesaid disadvantages it is known to provide through-vent openings in the walls of tire vulcanizing molds, so as to permit trapped gases to escape freely. Through-vents of this type are seen, for example in U.S. Pat. 1,019,506 issued to W. A. McKool. Such through-vents, however, not only permit the gases to freely escape from the mold interior but necessarily permit the rubber tire material, which is in softened condition and under pressure within the mold, also to escape. As a result, long needle-like protrusions of rubber are formed on the tire surface wherever a through-vent was located in the mold. This so-called "vent rubber" has the following obvious disadvantages. First, some of the vent rubbers will break off when the mold is opened and the tire is removed. Those that break off may either remain in the vent passage—requiring such passage to be cleaned out before the next tire is processed—or, they may fall into another portion of the mold and be cured into subsequent tires molded in that same mold. The unbroken vent rubbers remain on the tire in the form of long, unsightly protrusions extending from the tire sidewall surface, and must be trimmed. This, of course, requires a separate trimming operation which is difficult and costly particularly since it involves those regions of the tire sidewalls which have indicia thereon in-relief. Great care must be taken not to damage the relief markings during the vent rubber trimming operation.

A primary object of the present invention, therefore, is to provide a method for finish-molding and vulcanizing of tires, which will overcome the aforesaid disadvantages of the presently known molds.

It is a further object of the present invention to provide a vulcanizing method which will eliminate gas-bubble blemishes in the sidewall areas of tires automatically and without requiring a later trimming operation.

Another object of the present invention is to provide a novel method for accomplishing the aforesaid.

Other objects and advantages of the present invention will become apparent from the following description of the preferred form of the invention, reference being had to the accompanying drawings in which:

FIG. 1 is a top plan view of one of a pair of opposing sections of a vulcanizing mold according to the present invention;

FIG. 2 is a partial transverse sectional view, enlarged, of the vulcanizing mold section of FIG. 1 taken along line II—II in the direction of the arrows and showing, in phantom, an opposed mold section;

FIG. 3 is a greatly enlarged view of a portion of the structure illustrated in FIG. 2, i.e., through a portion of the indicia marking means and adjacent gas trap cavity according to the present invention; and FIG. 4 is a greatly enlarged portion of the sidewall of a tire formed by the mold portion illustrated in FIG. 3.

The mold 1 herein shown comprises two complementary mold halves 2 and 3 forming a generally toroidal chamber 4 therebetween when the mold 1 is closed. A partly finished unvulcanized tire may be placed in the mold and the mold closed in the conventional manner.

Mold section 3 has an inner mold surface 5, which is adjacent to and comes in contact with the sidewall of a tire 6 placed in mold 1. Surface 5 is, according to the present invention, provided with indicia in the form of intaglio marking means 5a, as seen in FIG. 3. Such indicia may be in the form of letters, numerals, or the like, indicative of at least one characteristic, or physical property of the particular tire to be molded therewith. Such characteristic may, for example, be the name of the manufacturer of the tire, the size of the tire, the type of tire, the serial number, or the like. According to the present invention, there is provided in surface 5 adjacent to and in close proximity to the region of the marking means 5a, a cavity means preferably comprising a plurality of blind drill holes 5b. These blind holes, or cavities 5b are preferably drilled in the mold surface 5 to a depth D (seen in FIG. 3) which preferably exceeds, at least slightly, the depth d of the relatively shallow indicia forming, i.e., marking means 5a, adjacent thereto in the mold surface 5. The volume of the cavity 5b and the depth thereof below the surface 5 is chosen in such a manner that a predictable amount of gaseous medium, e.g., air, can be stored therein, under a predictable pressure, during the vulcanizing process.

In use, when pressure and heat are applied to a partially finished tire located in mold 1, any air or other gaseous material otherwise trapped between the outer surface of the tire sidewall 6a and the inner surface 5 of the mold section 3, can escape into the nearest cavity 5b; be compressed therein by additional escaping gaseous medium, and be further compressed by softened tire rubber, under pressure, attempting to enter the cavity. The pressure of the gaseous medium in the cavity will oppose, i.e. resist, the entry, into the cavity, of tire rubber. When the gaseous medium in a cavity 5b has been compressed to a point where the pressure within the cavity equals the pressure with which the rubber is trying to enter, additional rubber will be prevented from entering. Thus, where gaseous medium has been trapped in a cavity 5b, rubber cannot fill such cavity completely but can only fill it to the extent permitted by the compressed gas therein.

The principal function of the cavities 5b is to provide a pocket, outwardly of the inner molding surface 5, so that the last minute amount of air or other gaseous medium which may be trapped between the tire sidewall 6a and the inner mold surface 5, will have an avenue of escape. As aforesaid, the air, or other gaseous medium, trapped in a cavity 5b offers considerable resistance to adjacent tire rubber during the molding process, with the result that the length L of the "vent rubber," i.e., rubber protrusion 6b on the tire after vulcanizing (but without trimming) is shorter than the depth D of the cavity 5b. This length L of the vent rubber 6b was found, on a finished tire, to be approximately $\frac{1}{16}$" where the cavity 5b was drilled to a depth D of $\frac{3}{32}$" with a #1 Center drill. The latter is stated only by way of example and is not intended to be limiting in any way.

Also by way of example, the particular arrangement of cavities 5b as seen in FIG. 1 was found to work satisfactorily to prevent blemishes on tires vulcanized in a mold having such configuration where the indicia 5a was in the form of letters in intaglio in surface 5. The dimension $x$ represents the distance between an extremity of the indicia marking means 5a and an adjacent cavity 5b. By way of example, in a particular passenger automobile tire mold, the distance $x$ (see FIG. 3) was chosen to be approximately $\frac{1}{2}$ inch (see FIG. 1) with indicia means 5a comprising letters ranging in length Y between approximately $\frac{1}{8}$" and $\frac{1}{2}$" and having a depth $d$ of approximately .025". The cavity means 5b was drilled, using a #1 Center drill, to a depth D of approximately $\frac{3}{32}$", with the result that height L of protrusion 6b was approximately $\frac{1}{16}$", i.e., clearly within the acceptable limit of three times the indicia height $l$, so that trimming was not necessary. The tire region bearing the indicia 6c was found to be free of blemishes so that the indicia 6c were highly legible.

According to the present invention, therefore, gaseous medium, whether it be air or other gases present during the final stages of the molding operation, is able to escape from the regions of the marking means 5a into the cavity means 5b provided in the mold surface 5 closely adjacent to such marking means. The cavities defined by cavity means 5b are of relatively short depth and are configurated in such a manner that the gaseous medium escaping thereinto will be compressed therein so as to produce a pressure which will act in opposition to tire rubber attempting also to escape into such cavities during the vulcanizing and finish-molding process. This opposing pressure prevents the escaping tire rubber from filling the cavities 5b. The configuration of the cavities is chosen in such a manner, with relation to the depth of the indicia 5c that in the finished product, as best seen in FIG. 4 of the drawings, the height L of the escaped rubber 6b is no greater than approximately three times the height $l$ of the indicia formed in relief on the sidewall outer surface 6a. A height L of no greater than three times $l$ is considered acceptable and therefore, does not require a trimming operation. Thus, blemishes resulting in the total or partial obliteration of the indicia molded on the surface of tire sidewalls, resulting from trapped gaseous medium, are avoided by the present invention without the requirement of an additional trimming operation.

Although a preferred form of the invention has been described and shown in the drawings, it will be understood that variations and modifications may be made by anyone skilled in the art without departing from the scope of the present invention, which is defined by the following appended claim.

Having thus described my invention, what I claim and desire to protect by Letters Patent is:

1. In a method of finish molding and vulcanizing a tire in a vulcanizing mold having an inwardly facing mold surface adapted to engage the sidewall portion of a tire and a closed ended cavity having substantially conically shaped wall portions extending in a direction outwardly of said inwardly facing mold surface and communicating at its larger open end with the space defined by said mold surface, said mold surface having, in the region adjacent said cavity, indicia to be formed in said tire sidewall the steps of:

placing a partially formed tire into said space defined by said mold surface;

pressing the sidewall region of the tire and said mold surface toward each other;

permitting at least a portion of the gaseous material trapped between said mold surface and the tire sidewall in the region of said indicia to escape into said cavity so that said gaseous material will not interfere with the molding of the indicia in said tire sidewall;

permitting some tire sidewall rubber to follow said gaseous material into the larger open end of said conically shaped cavity so as to compress said gaseous material ahead of it in the region of the closed end of said cavity;

guiding said tire sidewall rubber in said conically shaped cavity in a direction from the open toward the closed end of said cavity through said wall portions of said cavity of progressively smaller cross-sectional area whereby the pressure of said trapped gaseous material builds up sufficiently rapidly for preventing the rubber from reaching the closed end of said cavity and for forming the rubber in the cavity into a dimple having an outer surface resembling a portion of a sphere and a height-to-base ratio no greater than unity, whereby trimming thereof is not required.

References Cited

UNITED STATES PATENTS

| | | | |
|---|---|---|---|
| 1,380,085 | 5/1921 | Walton. | |
| 2,296,016 | 9/1942 | Bostwick | 18—38 |
| 2,679,277 | 5/1954 | Gray | 152—330 |
| 2,765,494 | 10/1956 | Weingart | 18—34 |
| 3,145,423 | 8/1964 | Horvereid | 18—42 |
| 3,377,662 | 4/1968 | Fukushima | 18—38 |
| 2,651,810 | 9/1953 | Snyder | 18—42 |

FOREIGN PATENTS 201,607    1956    Australia.

ROBERT F. WHITE, Primary Examiner

R. R. KUCIA, Assistant Examiner

U.S. Cl. X.R.

18—38; 264—293, 315, 326